(12) United States Patent
Freitas

(10) Patent No.: US 8,156,350 B2
(45) Date of Patent: Apr. 10, 2012

(54) CONTROLLING MULTILEVEL SHARED RESOURCES IN A COMPUTING DEVICE

(75) Inventor: Carlos Freitas, London (GB)

(73) Assignee: Nokia Corporation, Espoo (FI)

( * ) Notice: Subject to any disclaimer, the term of this patent is extended or adjusted under 35 U.S.C. 154(b) by 424 days.

(21) Appl. No.: 12/063,199

(22) PCT Filed: Aug. 8, 2006

(86) PCT No.: PCT/GB2006/002950
§ 371 (c)(1),
(2), (4) Date: Mar. 15, 2010

(87) PCT Pub. No.: WO2007/017664
PCT Pub. Date: Feb. 15, 2007

(65) Prior Publication Data
US 2010/0169679 A1   Jul. 1, 2010

(30) Foreign Application Priority Data

Aug. 10, 2005   (GB) .................... 0516447.0

(51) Int. Cl.
*G06F 1/00* (2006.01)
*G01R 15/00* (2006.01)
*G01R 21/00* (2006.01)
(52) U.S. Cl. ........ 713/300; 713/320; 713/323; 713/324; 702/57; 702/60
(58) Field of Classification Search .................. 713/300, 713/320, 323, 324; 702/57, 60
See application file for complete search history.

(56) References Cited

U.S. PATENT DOCUMENTS

| 4,747,041 | A |   | 5/1988  | Engel et al. |
| 5,423,046 | A |   | 6/1995  | Nunnelley et al. |
| 5,894,579 | A |   | 4/1999  | Fujihara |
| 5,919,264 | A | * | 7/1999  | Reneris ........................ 713/324 |
| 6,105,142 | A |   | 8/2000  | Goff et al. |
| 6,128,745 | A | * | 10/2000 | Anderson et al. ............ 713/323 |
| 6,760,852 | B1 | * | 7/2004  | Gulick .......................... 713/324 |
| 6,802,014 | B1 | * | 10/2004 | Suurballe ..................... 713/300 |
| 2004/0003303 | A1 |   | 1/2004 | Oehler et al. |

FOREIGN PATENT DOCUMENTS

| EP | 0676685 A2 | 3/1995 |
| EP | 0871106 A2 | 3/1998 |
| WO | WO 94/16378 | 7/1994 |
| WO | 2005017468 A2 | 2/2005 |

(Continued)

OTHER PUBLICATIONS

Benini, L et al., "Battery-Driven Dynamic Power Management of Portable Systems", System Synthesis, 2000, pp. 25-30, Proceedings of the 13th International Symposium on Sep. 20-22, 2000, Piscataway, New Jersey.

(Continued)

*Primary Examiner* — Stefan Stoynov
(74) *Attorney, Agent, or Firm* — Alston & Bird LLP

(57) ABSTRACT

A computing device is arranged to include a resource manager that controls access to all power resources on the device. The resource manager detects unused devices by counting the components that have requested usage and powers down unused resources, and for those resources offering multiple power levels, it guarantees that the operating level is no higher than is needed.

17 Claims, 1 Drawing Sheet

FOREIGN PATENT DOCUMENTS

WO    PCT/GB06/002950      11/2006

OTHER PUBLICATIONS

Written Opinion for International Application No. PCT/GB2006/002950 (undated).

Office Action for Chinese Application No. 2006800295251 dated Nov. 6, 2009.

Office Action for Chinese Application No. 200680029525.1 dated Sep. 8, 2010.

UK Search Report, dated Dec. 12, 2006, issued in corresponding GB Application No. GB0616573.

\* cited by examiner

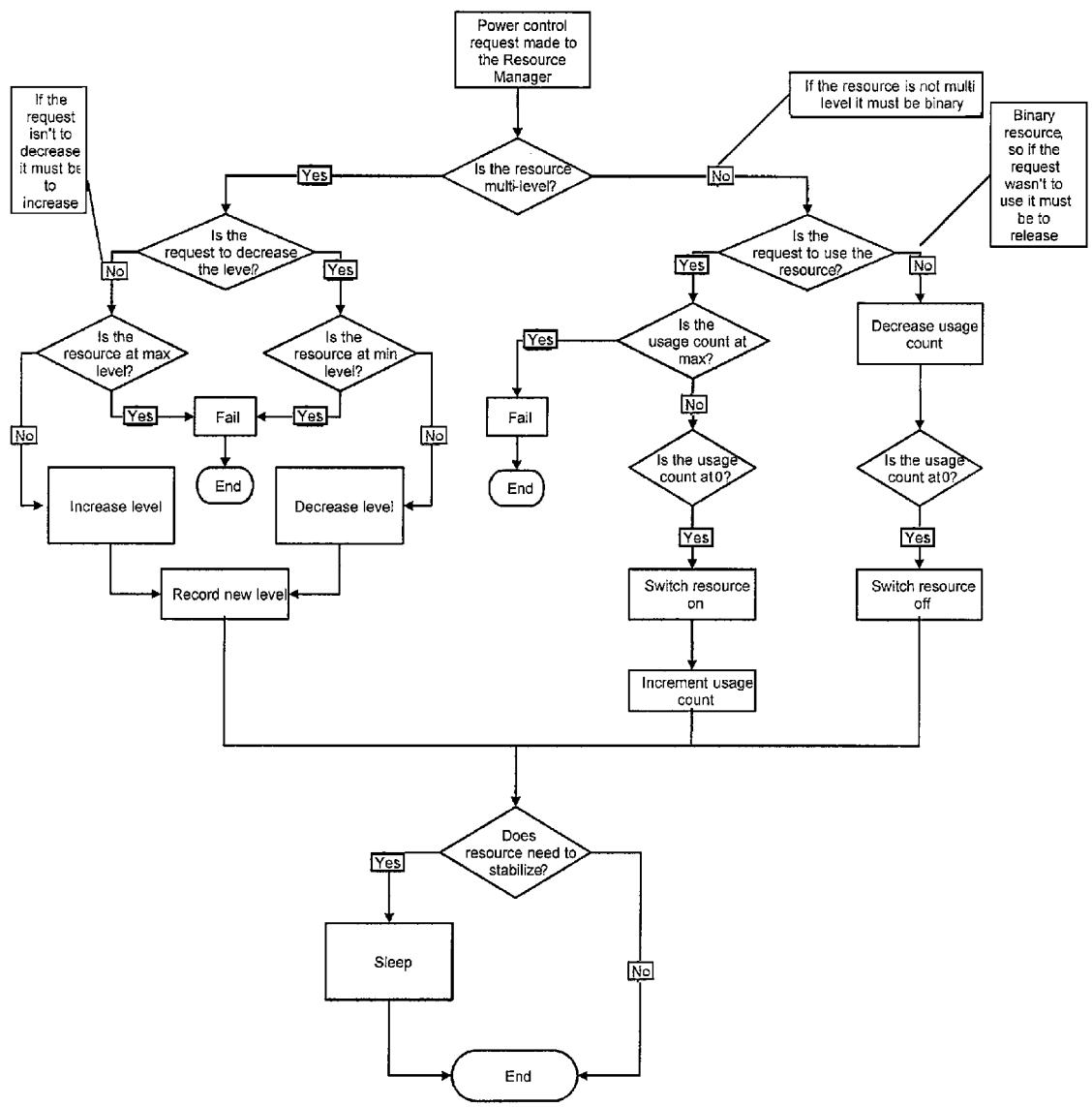

CONTROLLING MULTILEVEL SHARED RESOURCES IN A COMPUTING DEVICE

CROSS REFERENCE TO RELATED APPLICATIONS

This application claims the priority of PCT/GB2006/002950 filed on Aug. 8, 2006, which claims priority to GB 0516447, filed on Aug. 10, 2005, the entire contents of which are hereby incorporated in total by reference.

FIELD OF THE INVENTION

This invention relates to an improved method of power management in a computing device, and in particular to a method of power management comprising setting multilevel shared resources in a computing device.

BACKGROUND OF THE INVENTION

The term 'computing device' includes, without limitation, Desktop and Laptop computers, Personal Digital Assistants (PDAs), Mobile Telephones, Smartphones, Digital Cameras and Digital Music Players. It also includes converged devices incorporating the functionality of one or more of the classes of device already mentioned, together with many other industrial and domestic electronic appliances.

An increasing number of these devices are mobile and battery-operated, and proper management of power resources and power consumption on the device is critical for ensuring that power is not wasted, and that the user gets a reasonable and respectable amount of use out of one set of batteries or one charge of the internal batteries.

Power resources in computing devices may vary in complexity, from simple binary resources that can be switched on or off almost instantaneously to resources that can be set at different voltage levels or that take a definable time period to change state. There are also resources that may only be changed in conjunction with other resources.

Overcoming the power constraints of a mobile computing device can be done in a number of ways. These include
- producing and using batteries with a higher storage capacity
- producing and using components which consume less power for a particular task; for example, mobile music devices can be provided with headsets that require less power to produce a given level of sound to a user in comparison to the use of loudspeakers.
- reducing the power consumed by components reserved for certain tasks or applications; for example, the user of a mobile music device can reduce the signal output level to their headset in order to conserve power. Another example is the way mobile telephones can reduce their transmission power down to the minimum necessary to communicate with a base station.

Recent innovations in the design of mobile computing devices, notably mobile telephones, define a number of shared software-definable power resources, such as clock frequencies, variable voltages and switchable power rails. However, the fact that shared power resources contained within a computing device can operate at many levels has not yet been taken into account for efficient power management. There is a need for intelligent management of these multilevel shared power resources. Because they are shared, and are not reserved for specific applications, this control is best handled as part of the operating system (OS) that has overall control of the hardware and the software in the device.

SUMMARY OF THE INVENTION

This invention discloses a method of power management that takes advantage of multilevel shared power resources by which such shared resources are operated at the minimum level needed to satisfy the hardware or software component with the highest active power requirement.

According to a first aspect of the present invention there is provided a method of managing a shared power resource on a computing device by means of a first component and in which all further components requiring access to the power resource can only do so by making requests of the first component.

According to a second aspect of the present invention there is provided a computing device arranged to operate in accordance with a method of the first concept.

According to a third aspect of the present invention there is provided an operating system for causing a computing device to operate in accordance with a method of the first concept.

BRIEF DESCRIPTION OF THE DRAWINGS

Embodiments of the present invention will now be described, by way of further example only, with reference to FIG. 1.

FIG. 1 shows a method of sharing resources in accordance with the present invention.

DETAILED DESCRIPTION OF THE INVENTION

Software can control most power resources allocated to each independent hardware component independently of each other. This includes the central processing unit (CPU) and any peripheral components. Other power resources which may be shared between hardware components are controlled be means of tracking their usage.

Controllable power resources may be spread across several functional hardware areas of a device. However, in most cases, it is possible to concentrate the control of power resources on a single software component, which is referred to in this description as the resource manager, which offers a conceptual representation and interfaces for all resources.

It is the management of shared power resources which are of the most interest. Two main types of control model are envisaged.

Shared Binary Resources

These resources are either on or off. A typical implementation of this model associates a usage counter, which is set to zero, with the resource object being managed. A Use( ) function signals the power resource is in use and a hardware driver calls this when it needs the resource. This function increments the usage counter. If the counter's value changes from 0 to 1, the resource is turned on. A Release( ) function signals that the power resource is not in use; a hardware driver calls this function when it no longer needs the resource. This function decrements the usage counter. If the counter's value changes from 1 to 0, the resource is turned off.

This control model may add other functions. A useful addition is a function to obtain the current value of the usage counter. As well as indicating the status of the resource (on or off) knowing the value of the usage counter is especially important as some resources have a maximum acceptable load. When the cumulative load as indicated by the usage counter on a resource equals its maximum, any attempt to increase its usage count is arranged to fail.

Multi-Level Resources

These resources can be on or off, but they may also be shared. Therefore, the previous control model is not considered appropriate for such resources, because users may want to increase or decrease the level of the resource, rather than switch the particular resource on or off. Hence, a typical implementation should preferably keep track of both the current level of the resource and the requirement of each of the hardware drivers consuming the resource. If a hardware driver requests an increase of the level of use of the resource, then this is allowed unless the requested increase would take the use level above the maximum permissible level for the resource.

If the hardware driver requests a lowering of the level, the request is refused unless the driver is currently the sole holder of the highest level previously requested for that resource. In that case, the request is allowed but the level is only lowered as far as the next highest level previously requested. The considerations above regarding the maximum cumulative load still apply. However, in the case of multi-level resources, the maximum acceptable load may be different at different levels of resource usage.

The above control models can be seen in FIG. 1.

A third type of power resource is one that cannot be instantaneously varied. For instance, it may require a stabilisation period after being changed. Such resources need to be addressed slightly differently; the hardware driver that requests the resource change needs to wait for the resource to be stable before proceeding. But, because busy-waiting loops are strongly discouraged (they consume power to no purpose and also harm real-time performance) it is preferable that the driver thread should be arranged to sleep for a period of time sufficient to allow the resource to stabilise, after which the status of the resource can be checked. This control model can also be seen in FIG. 1.

Software architectures in which device drivers share the same thread may find that sleeping for a fixed period while waiting for a resource to stabilise could adversely affect other device drivers, which will also be held up during the sleep period. If this occurs, a separate thread can be spawned for the device driver that wants to request the resource change, from which the request should be made. This thread can sleep without affecting the performance of other drivers, and on wakeup can then call back to the main driver thread when the resource concerned has finally stabilised.

Where an operating system is multi-threaded in nature, the invention provides that code for hardware drivers that accesses power resources does so with the kernel locked to guarantee their consistency. This should preferably be made mandatory for shared resources, when accesses can be performed from different threads. If an interrupt service routine can read or change resources, interrupts should also be disabled around any access points.

In summary, therefore, a computing device is arranged to include a resource manager that controls access to all power resources on the device. The resource manager detects unused devices by counting the components that have requested usage and powers down unused resources, and for those resources offering multiple power levels, it guarantees that the operating level is no higher than is needed.

It can be seen therefore that the present invention provides significant benefits in comparison to the known methods for operating computing devices by eliminating wastage of power resources, thereby improving the length of time that a battery operated computing device can operate on a single set of batteries or a single charge. It also reduces power consumption when applied to mains powered computing devices, providing environmental benefits through reduced power consumption.

Although the present invention has been described with reference to particular embodiments, it will be appreciated that modifications may be effected whilst remaining within the scope of the present invention as defined by the appended claims.

The invention claimed is:

1. A method comprising:
   receiving, at a first component, a power control request originated by a further component related to a shared power resource on a computing device, wherein all further components requiring access to the shared power resource can only do so by making requests of the first component; and
   managing, by the first component, the shared power resource in response to the power control request,
   wherein in an instance in which the shared power resource is a binary resource having an off state and an on state, managing the shared power resource in response to the power control request comprises:
      decrementing a usage counter maintained by the first component in an instance in which the power control request comprises a request to release the shared power resource and switching off the shared power resource in an instance in which the counter is decremented to zero;
      incrementing the usage counter in an instance in which the power control request comprises a request to access the shared power resource and fulfillment of the power control request would not cause the shared power resource to exceed its maximum acceptable load; and
      refusing the power control request in an instance in which the power control request comprises a request to access the shared power resource and fulfillment of the power control request would cause the shared power resource to exceed its maximum acceptable load.

2. A method according to claim 1, wherein in an instance in which the shared power resource is a multi-level resource having an off state and an on state that supports multiple power output levels, managing the shared power resource in response to the request comprises:
   the first component tracking the current output level of the shared power resource and the output levels currently requested by one or more further software components;
   in an instance in which the power control request comprises a request to increase the output level of the shared power resource, determining whether fulfilling the power control request would cause the shared power resource to exceed its maximum acceptable load, and fulfilling the power control request only in an instance in which it is determined that fulfilling the power control request would not cause the shared power resource to exceed its maximum acceptable load; and
   in an instance in which the power control request comprises a request to decrease the output level of the shared power resource, refusing the power control request unless the further component originating the power control request had previously requested the current output level and no other component had also requested the current output level, wherein in an instance in which the request to decrease the output level of the shared power resource is granted, the power level is decreased to the next highest level requested by a component.

3. A method according to claim 2, further comprising determining whether the shared power resource to which the power control request is related is a binary resource or a multi-level resource.

4. A method according to claim 1, wherein a request for a power resource made to the first component by a further component is not immediately satisfied and wherein a thread of execution containing the further component is suspended or caused to sleep for a period of time sufficient to enable the request to be satisfied.

5. A method according to claim 1, wherein a separate thread of execution is created for the purpose of making a request for the shared power resource.

6. A method according to claim 1, wherein the first component operates under control of a processor of the computing device.

7. An apparatus comprising a processor and a memory storing computer program code, wherein the memory and stored computer program code are configured, with the processor, to cause the apparatus to at least:
receive, at a first component, a power control request originated by a further component related to a shared power resource on a computing device, wherein all further components requiring access to the power resource can only do so by making requests of the first component; and
manage, by the first component, the shared power resource in response to the power control request,
wherein in an instance in which the shared power resource is a binary resource having an off state and an on state, the memory and stored computer program code are configured, with the processor, to cause the apparatus to manage the shared power resource in response to the power control request at least in part by causing the apparatus to:
decrement a usage counter maintained by the first component in an instance in which the power control request comprises a request to release the shared power resource and switch off the shared power resource in an instance in which the counter is decremented to zero;
increment the usage counter in an instance in which the power control request comprises a request to access the shared power resource and fulfillment of the power control request would not cause the shared power resource to exceed its maximum acceptable load; and
refuse the power control request in an instance in which the power control request comprises a request to access the shared power resource and fulfillment of the power control request would cause the shared power resource to exceed its maximum acceptable load.

8. An apparatus according to claim 7, wherein in an instance in which the shared power resource is a multi-level resource having an off state and an on state that supports multiple power output levels, the memory and stored computer program code are configured, with the processor, to cause the apparatus to manage the shared power resource in response to the power control request at least in part by causing the apparatus to:
track, by the first component, the current output level of the shared power resource and the output levels currently requested by one or more further software components;
in an instance in which the power control request comprises a request to increase the output level of the shared power resource, determine whether fulfilling the power control request would cause the shared power resource to exceed its maximum acceptable load, and fulfill the power control request only in an instance in which it is determined that fulfilling the power control request would not cause the shared power resource to exceed its maximum acceptable load; and
in an instance in which the power control request comprises a request to decrease the output level of the shared power resource, refuse the power control request unless the further component originating the power control request had previously requested the current output level and no other component had also requested the current output level, wherein in an instance in which the request to decrease the output level of the shared power resource is granted, the power level is decreased to the next highest level requested by a component.

9. An apparatus according to claim 8, wherein the memory and stored computer program code are configured, with the processor, to further cause the apparatus to determine whether the shared power resource to which the power control request is related is a binary resource or a multi-level resource.

10. An apparatus according to claim 7, wherein a request for a power resource made to the first component by a further component is not immediately satisfied and wherein a thread of execution containing the further component is suspended or caused to sleep for a period of time sufficient to enable the request to be satisfied.

11. An apparatus according to claim 7, wherein a separate thread of execution is created for the purpose of making a request for the shared power resource.

12. An apparatus according to claim 7, wherein the apparatus comprises or is embodied on a mobile phone.

13. A computer program product comprising a non-transitory computer-readable storage medium having computer-readable program instructions stored therein, the computer-readable program instructions comprising:
program instructions configured to receive, at a first component, a power control request originated by a further component related to a shared power resource on a computing device, wherein all further components requiring access to the power resource can only do so by making requests of the first component; and
program instructions configured to manage, by the first component, the shared power resource in response to the power control request,
wherein the program instructions configured to manage the shared power resource comprise program instructions configured, in an instance in which the shared power resource is a binary resource having an off state and an on state, to manage the shared power resource in response to the power control request at least in part by:
decrementing a usage counter maintained by the first component in an instance in which the power control request comprises a request to release the shared power resource and switching off the shared power resource in an instance in which the counter is decremented to zero;
incrementing the usage counter in an instance in which the power control request comprises a request to access the shared power resource and fulfillment of the power control request would not cause the shared power resource to exceed its maximum acceptable load; and
refusing the power control request in an instance in which the power control request comprises a request to access the shared power resource and fulfillment of the power control request would cause the shared power resource to exceed its maximum acceptable load.

14. A computer program product according to claim 13, wherein the program instructions configured to manage the shared power resource comprise program instructions configured, in an instance in which the shared power resource is a multi-level resource having an off state and an on state that supports multiple power output levels, to manage the shared power resource in response to the power control request at least in part by:

tracking, by the first component, the current output level of the shared power resource and the output levels currently requested by one or more further software components;

in an instance in which the power control request comprises a request to increase the output level of the shared power resource, determining whether fulfilling the power control request would cause the shared power resource to exceed its maximum acceptable load, and fulfilling the power control request only in an instance in which it is determined that fulfilling the power control request would not cause the shared power resource to exceed its maximum acceptable load; and in an instance in which the power control request comprises a request to decrease the output level of the shared power resource, refusing the power control request unless the further component originating the power control request had previously requested the current output level and no other component had also requested the current output level, wherein in an instance in which the request to decrease the output level of the shared power resource is granted, the power level is decreased to the next highest level requested by a component.

15. A computer program product according to claim 14, wherein the computer-readable program instructions further comprise program instructions configured to determine whether the shared power resource to which the power control request is related is a binary resource or a multi-level resource.

16. A computer program product according to claim 13, wherein a request for a power resource made to the first component by a further component is not immediately satisfied and wherein a thread of execution containing the further component is suspended or caused to sleep for a period of time sufficient to enable the request to be satisfied.

17. A computer program product according to claim 13, wherein a separate thread of execution is created for the purpose of making a request for the shared power resource.

\* \* \* \* \*